United States Patent [19]
Roszin

[11] Patent Number: 5,240,292
[45] Date of Patent: Aug. 31, 1993

[54] INSULATED FITTINGS FOR FLEXIBLE AIR DUCTS

[76] Inventor: Joseph M. Roszin, R.D. #3, Box 147-D, Laurel, Del. 19956

[21] Appl. No.: 836,963

[22] Filed: Feb. 19, 1992

[51] Int. Cl.$^5$ .................. F16L 39/00; F16L 41/00; F16L 59/00
[52] U.S. Cl. .................. 285/53; 285/156; 285/330; 285/64; 285/150
[58] Field of Search .......... 285/47, 155, 156, 330, 285/177, 293, 64, 913, 903, 150, 424, 53, 55

[56] References Cited

U.S. PATENT DOCUMENTS

| | | | |
|---|---|---|---|
| 2,937,662 | 5/1960 | Green | 285/47 |
| 3,453,716 | 7/1969 | Cook | 285/47 |
| 3,645,564 | 2/1972 | Corriston | 285/47 |
| 3,857,590 | 12/1974 | Meeker | 285/47 |
| 4,416,474 | 11/1983 | Miller et al. | 285/47 |
| 4,462,618 | 7/1984 | Stone | 285/47 |
| 4,475,749 | 10/1984 | Pforr et al. | 285/47 |
| 4,569,110 | 2/1986 | Goettel | 285/424 |
| 4,890,864 | 1/1990 | Anderson et al. | 285/47 |
| 5,133,579 | 7/1992 | Anderson et al. | 285/424 |

FOREIGN PATENT DOCUMENTS 1270228  4/1972  United Kingdom .......... 285/47

*Primary Examiner*—Eric K. Nicholson
*Attorney, Agent, or Firm*—Brady, O'Boyle & Gates

[57] ABSTRACT

An insulated fitting for a flexible air duct wherein the fitting has a collar for dressing the end of the flexible air duct coupled to the fitting. The fitting can be a tee, wherein the collar is connected to a retaining ring rotatably mounted to the main conduit of the tee so that the angular position of the tee can be varied depending upon the desired direction of the branch conduit of the tee. The retaining ring has a base portion for securing the T-fitting to a supporting surface The fitting can also be a wye and a reducer.

10 Claims, 4 Drawing Sheets

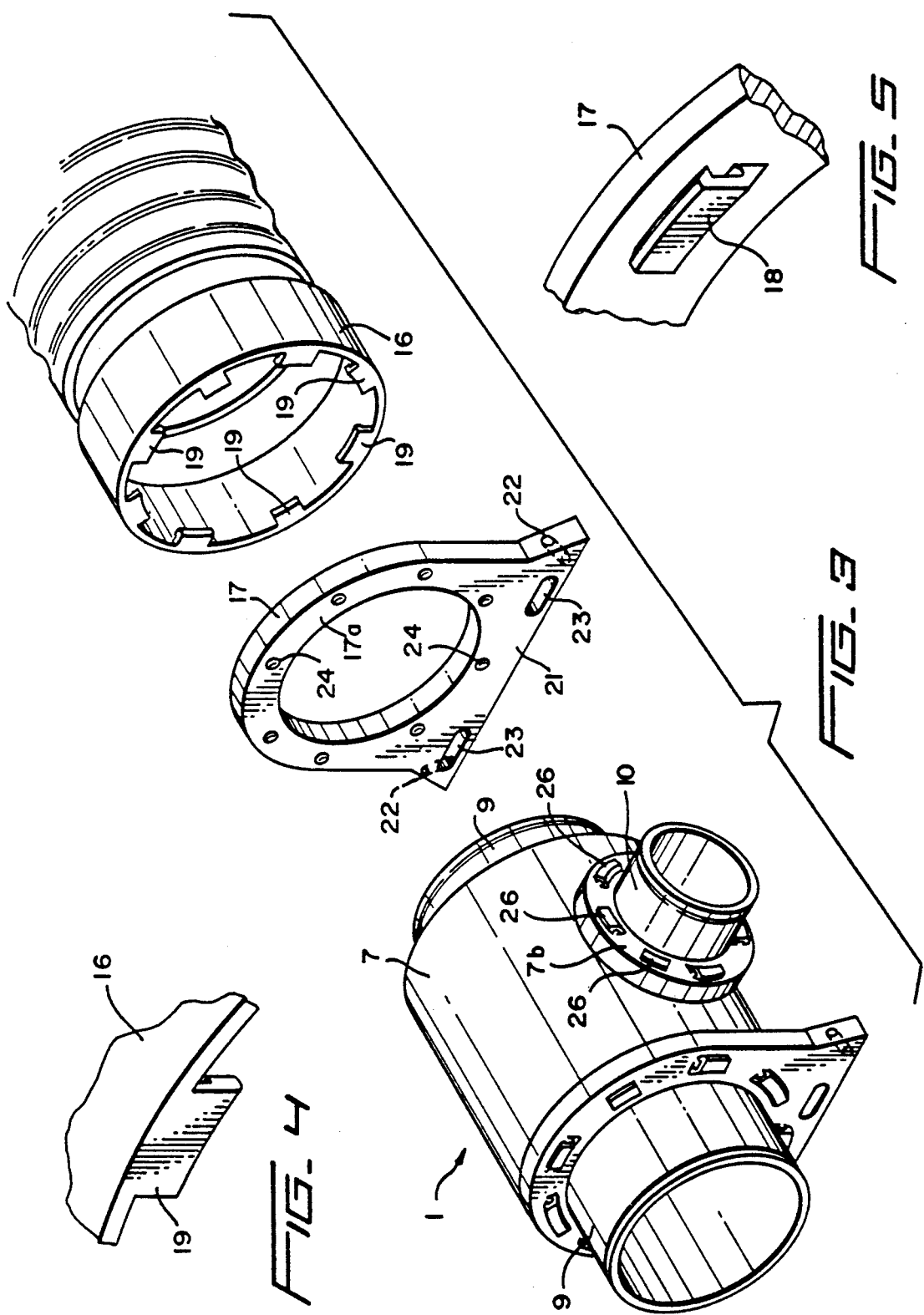

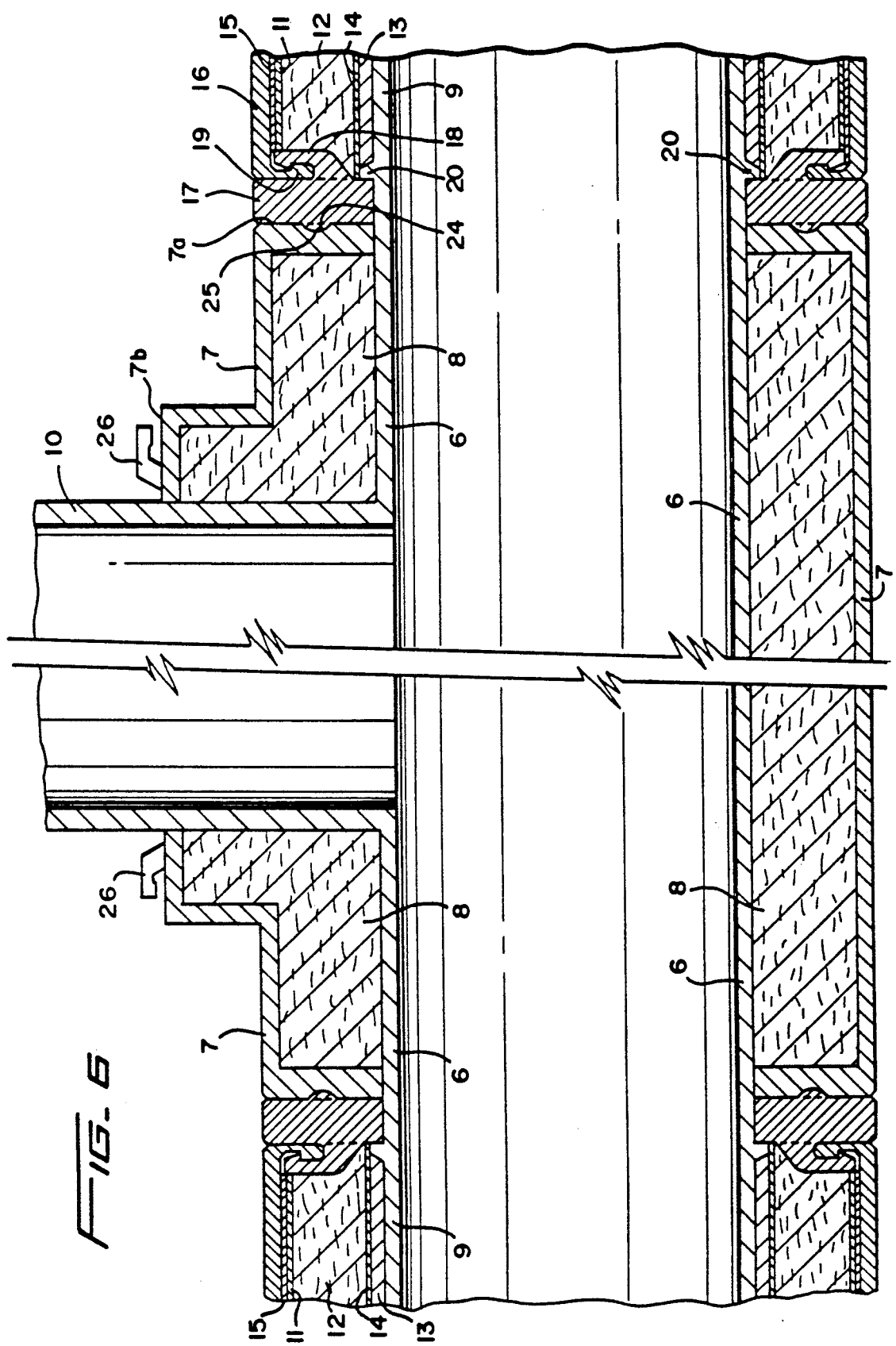

1

INSULATED FITTINGS FOR FLEXIBLE AIR DUCTS

BACKGROUND OF THE INVENTION

Flexible air ducts used in heating and air conditioning systems include an inner liner or core, a layer of insulation and an outer cover or jacket. To date, the primary purpose of the flexible air duct was for it to be used as branch runs where smaller diameter ducts are connected to a sheet metal or rigid fiberglass ductboard main air trunk and communicate with registers in rooms or zones.

SUMMARY OF THE INVENTION

After considerable research and experimentation, the fittings of the present invention have been devised so that larger sizes of flexible duct can be used as the main trunk while the smaller sizes can be used as branch runs. The fittings of the present invention comprise, essentially, an inner shell and an outer shell having a layer of insulation therebetween. The inner shell has a tapered conduit upon which the end of the flexible duct is taped. A supporting ring is mounted on the fitting conduit and is provided with keepers for cooperating with keepers on a collar slidably mounted over the taped end of the flexible duct to thereby dress the taped end of the flexible duct to provide a professional appearance. The fittings are constructed as tee-shaped, wye-shaped and reducers and can be made of plastic or metallic material or both which can sustain various temperature ranges without cracking.

The thickness of the insulation layer is the same as that of the flexible duct insulation layer, whereby the outer shell of the fitting is aligned with the outer jacket of the flexible duct.

The supporting ring is rotatably adjustable on the fitting so that the fitting can be mounted on flooring, joists or be suspended and rotated to the desired angle.

BRIEF DESCRIPTION OF THE DRAWINGS

FIG. 3 is an exploded, perspective view of the tee-shaped fitting and cooperating support ring and collar:

FIG. 4 is a fragmentary perspective view of one of the keepers on the collar

FIG. 5 is a fragmentary perspective view of one of the keepers on the support ring:

FIG. 6 is an enlarged, sectional side elevational view of the tee-fitting having a support collar and duct collar connected to each and thereof:

DESCRIPTION OF THE PREFERRED EMBODIMENTS

Figure 1:
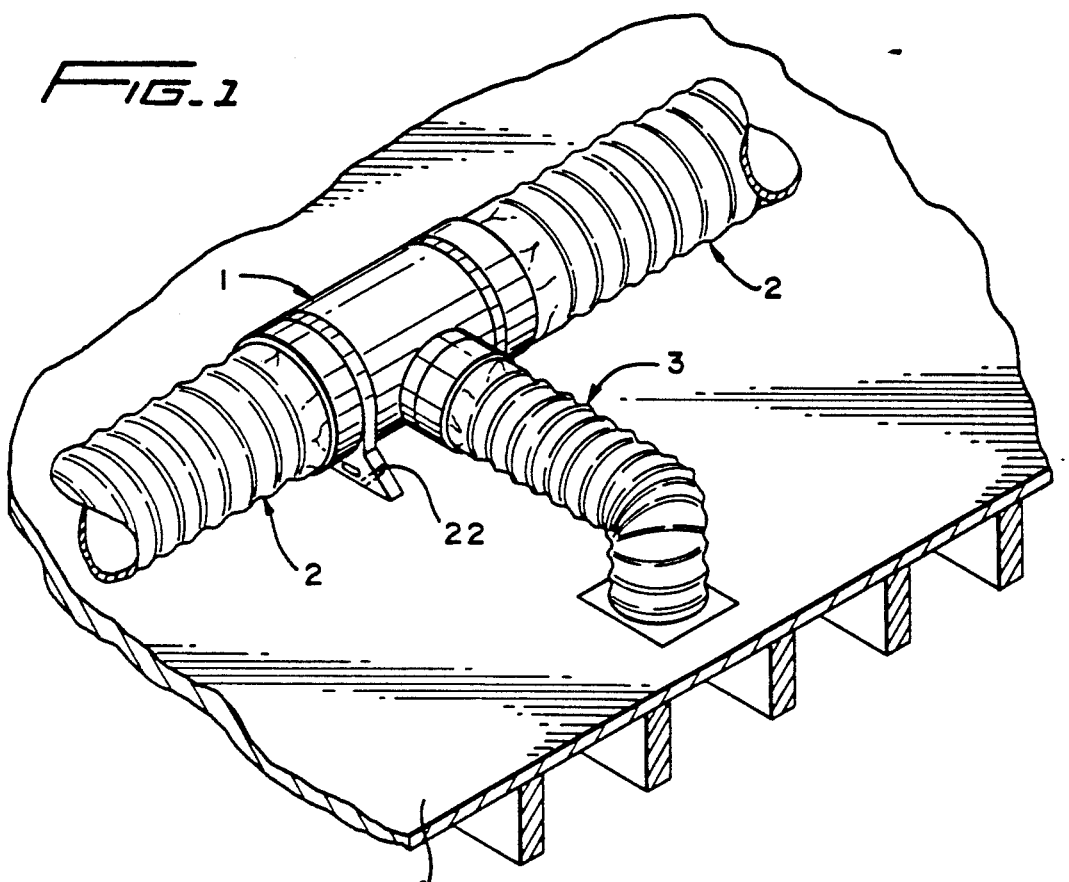
FIG. 1 is a perspective view of flexible air ducts connected to the tee-shaped fitting of the present invention mounted on a floor.
Figure 2:
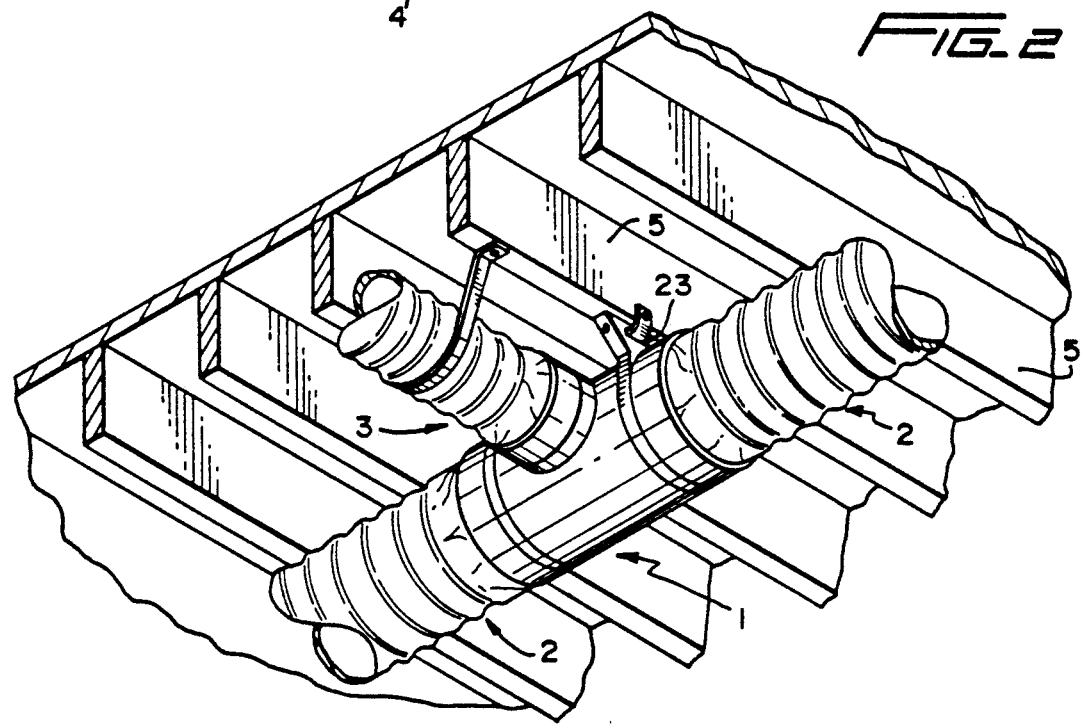
FIG. 2 is a perspective view of the tee-shaped fitting secured to floor joists.

Referring to the drawings and more particularly to FIGS. 1 and 2, the fitting 1 of the present invention is employed to connect conventional flexible air ducts 2 and 3 used in heating and air conditioning systems, the particular illustrated fitting being a T-shaped fitting constructed and arranged to be mounted on a floor 4 or secured to floor joists 5, whereby air ducts 2 can be used as a main trunk while the smaller ducts 3 can be used as branch runs.

The details of the construction of the T-shaped fitting 1 are illustrated in FIGS. 3 and 6, wherein it will be seen that the fitting comprises an inner tubular shell 6 and an outer tubular shell 7 having a layer of insulation 8 therebetween. The inner shell 6 includes a main integral conduit having tapered portions 9, and a branch conduit 10 extending normal to and communicating with the main conduit.

The flexible air ducts 2 and 3 are connected to the main and branch conduits by pulling the jacket 11 and insulation 12 away from the core 13 and taping or banding the core to the conduit as at 14. The insulation 12 and outer jacket 11 are placed back over the insulation and core 13, and the outer jacket 11 is taped or banded as at 15.

In order to dress the coupled end of the flexible duct, a collar 16 is slidable over the end of the taped flexible duct and is held in place by a retaining ring 17 having a plurality of circumferentially spaced, radially outwardly extending keepers 18 cooperating with a plurality of circumferentially spaced, correspondingly configured, radially inwardly extending keepers 19 provided on the end of the collar 16.

The retaining ring 17 is rotatably mounted on the inner tubular shell 6 and held thereon by a shoulder 20 formed integral with the conduit portion 9. As will be seen in FIGS. 1, 2 and 3, the retaining ring 17 is formed with a flared base portion 21 having nail receiving apertures 22 for securing the T-shaped fitting 1 to the floor 4, as shown in FIG. 1, and strap receiving openings 23 for securing the T-shaped fitting 1 to a floor joist 5, as shown in FIG. 2. By rotatably mounting the retaining ring 17 on the inner tubular shell 6, the retaining ring can be rotated so that the T-shaped fitting 1 can be secured to or suspended from any supporting surface positioned at various angles, depending upon the desired direction of the branch conduit 10. To hold the retaining ring 17 at the desired angular position, a plurality of circumferentially spaced protuberances 24 are formed on the inner face 17a of the ring 17 and cooperate with similarly configured, circumferentially spaced recesses 25 formed in the outer face 7a of the outer tubular shell 7.

To complete the description of the T-shaped fitting 1, the portion 7b of the outer tubular shell surrounding the branch conduit 10 is provided with a plurality of circumferentially spaced, radially outwardly extending keepers 26 which would cooperate with the keepers on a collar similar to that of collar 16, to thereby dress the end of a flexible conduit which would be secured to the branch conduit 10.

Figure 7:
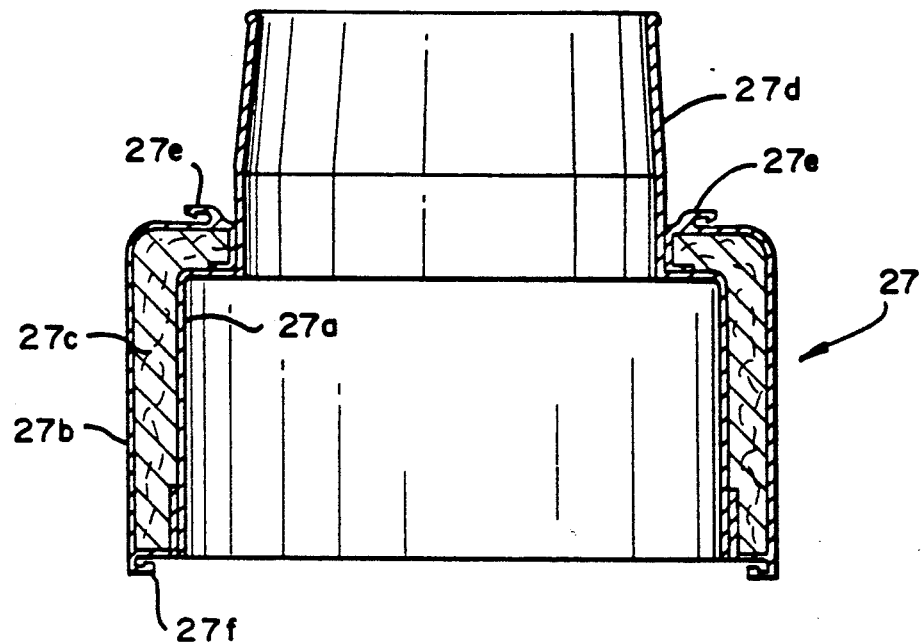
FIG. 7 is a sectional, elevational view of a reducer fitting of the present invention.
Figure 8:
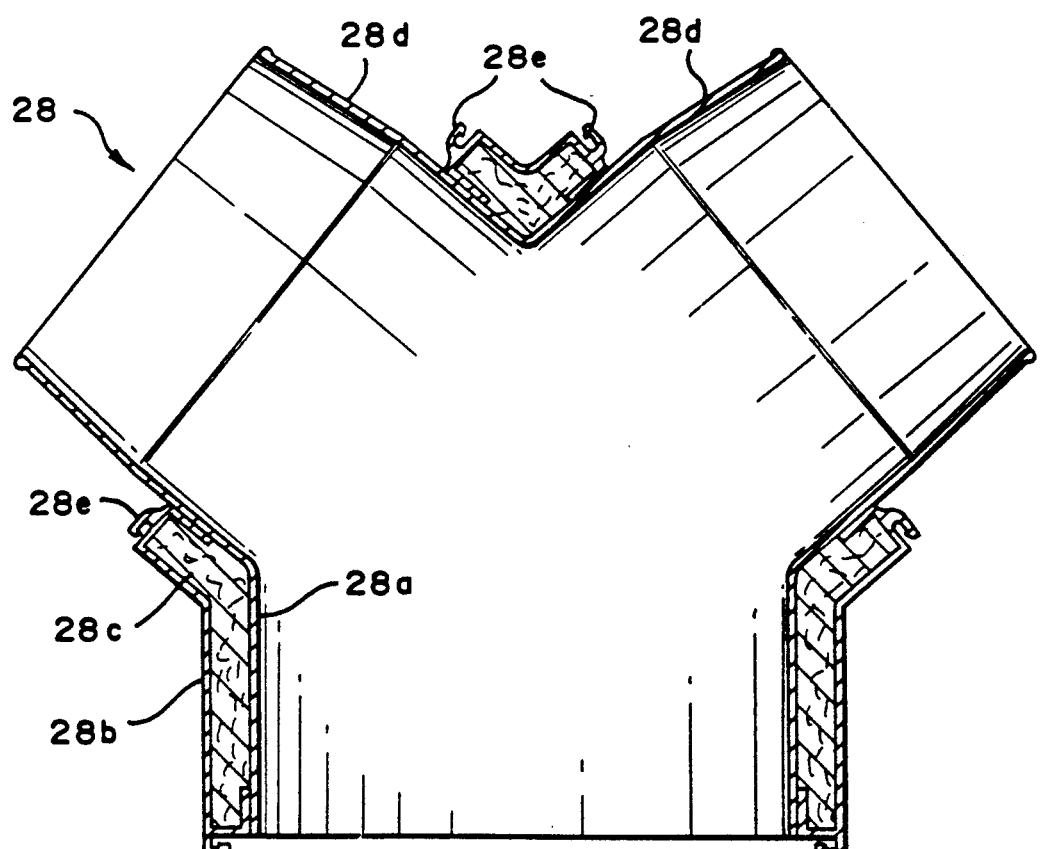
FIG. 8 is a sectional, elevational view of a wye fitting of the present invention.

While the description of the insulated fitting of the present invention has been directed to the T-shaped fitting 1 as shown in FIGS. 1 to 6, the salient features of the T-shaped fitting can also be employed in other fittings such as a reducer 27 illustrated in FIG. 7 and a wye shaped fitting 28 shown in FIG. 8. In each instance, the fittings comprise an inner shell 27a, 28a, and outer shell 27b, 28b and a layer of insulation 27c and 28c therebetween. The reducer 27 is provided with a tapered conduit 27d and the wye shaped fitting 28 is provided with tapered branch conduits 28d. The end faces of the outer tubular shells 27b and 28b are provided with circumferentially spaced radially outwardly extending keepers 27e and 28e adapted to receive keepers on a collar similar to the collar 16 shown in FIGS. 3 and 6 to thereby dress the ends of the flexible ducts which would be taped to the tapered conduits 27d and 28d.

The opposite end races of the outer tubular shells 27b and 28b are each provided with a radially inwardly extending flange 27f and 28f forming a catch for coupling another fitting thereto.

From the above description, it will be appreciated by those skilled in the art that the insulated fittings of the present invention provide an improved connection for the main trunk and branch runs of insulated flexible air ducts. The rotatably mounted retaining ring 17 being adjustable on the T-shaped fitting so that the fitting can be mounted on flooring, joists, or suspended at any desired angle. The collar 16 connected to the retaining ring 17 covers the secured end of the flexible air ducts 2 and 3 to thereby provide a professional appearance, the same being true of collars connected to reducers and wye shaped fitting having ducts secured thereto.

It is to be understood that the form of the invention herewith shown and described is to be taken as a preferred form of the invention, and that various changes in the shape, size and arrangement of parts may be resorted to, without departing from the spirit of the invention or scope of the subjoined claims.

I claim:

1. An insulated tee-shaped fitting for a flexible air duct comprising, an inner tubular shell and an outer tubular shell shaped radially outwardly from the inner shell, a layer of insulation mounted within the space between the inner and outer shells, said inner shell providing a main conduit portion and a branch conduit portion extending normal to and communicating with the main conduct portion to thereby form said tee-shaped fitting, an end face extending between the inner and outer shells at the main conduit portion of said tee-shaped fitting, a retaining ring rotatably mounted on said inner shell adjacent said end face, a shoulder integral with the inner shell and engaging the retaining ring for holding the retaining ring thereon, the retaining ring being positioned between said end face and said shoulder, circumferentially spaced, radially outwardly extending keepers integral with one face of the retaining ring, a collar, a plurality of circumferentially spaced, radially inwardly extending keepers integral with the collar and cooperating with the keepers on the retaining ring, to thereby connect the collar to said retaining ring, the end portion of a flexible insulated air duct being secured to the inner shell at the main conduit portion of the tee-shaped fitting, said collar extending over the end of the air duct to cover the secured end portion, to thereby improve the appearance of the connection.

2. An insulated fitting for a flexible air duct according to claim 1, wherein the opposite face of said retaining ring abuts said end face, a plurality of circumferentially spaced protuberances integral with said opposite face of said retaining ring, a plurality of circumferentially spaced similarly configured recesses provided in said end face and receiving said protuberances, whereby the retaining ring is held in a desired angular position, depending upon the desired direction of the branch conduit.

3. An insulated fitting for a flexible air duct according to claim 2, wherein the retaining ring is provided with a base portion, nail receiving apertures and strap receiving apertures formed in said base portion, whereby the T-shaped fitting can be selectively secured to and suspended from a supporting surface.

4. An insulated fitting for a flexible air duct according to claim 1, wherein the inner and outer shells are made of plastic, whereby the fitting can sustain various temperature ranges without cracking.

5. An insulated fitting for a flexible air duct according to claim 1, wherein the inner and outer shells are made of metallic material, whereby the fitting can sustain various temperature ranges without cracking.

6. An insulated fitting for a flexible air duct according to claim 1, wherein the main conduit portion is tapered to facilitate the mounting of the end of the air duct thereon.

7. A tee-shaped fitting for an air duct wherein the fitting includes a main conduit portion and a branch conduit portion extending normal to and communicating with the main conduit portion, an end face extending normal to the main conduit portion, a retaining ring rotatably mounted on said main conduit portion adjacent said end face, a shoulder integral with the main conduit portion and engaging the retaining ring for holding the retaining ring thereon, the retaining ring being positioned between said end face and said shoulder, circumferentially spaced, radially outwardly extending keepers integral with one face of the retaining ring, a collar, a plurality of circumferentially spaced, radially inwardly extending keepers integral with the collar and cooperating with the keepers on the retaining ring, to thereby connect the collar to said retaining ring, the end portion of an air duct being secured to the main conduit portion of the tee-shaped fitting, said collar extending over the end of the air duct to cover the secured end portion, to thereby improve the appearance of the connection.

8. A tee-shaped fitting according to claim 7, wherein the opposite face of said retaining ring abuts said end face, a plurality of circumferentially spaced protuberances integral with said opposite face of said retaining ring, a plurality of circumferentially spaced similarly configured recesses provided in said end face and receiving said protuberances, whereby the retaining ring is held in a desired angular position, depending upon the desired direction of the branch conduit portion.

9. A tee-shaped fitting according to claim 8, wherein the retaining ring is provided with a base portion, nail receiving apertures and strap receiving apertures formed in said base portion, whereby the tee-shaped fitting can be selectively secured to and suspended from a supporting surface.

10. A tee-shaped fitting according to claim 7, wherein the main conduit portion is tapered to facilitate the mounting of the end of the air duct thereon.

* * * * *